(12) United States Patent
Hada

(10) Patent No.: US 10,990,050 B2
(45) Date of Patent: Apr. 27, 2021

(54) IMAGE FORMING APPARATUS INCLUDING STORAGE DEVICE AND METHOD FOR CONTROLLING THE SAME

(71) Applicant: CANON KABUSHIKI KAISHA, Tokyo (JP)

(72) Inventor: Manabu Hada, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/358,471

(22) Filed: Mar. 19, 2019

(65) Prior Publication Data
US 2019/0310575 A1 Oct. 10, 2019

(30) Foreign Application Priority Data
Apr. 5, 2018 (JP) .............................. JP2018-073488

(51) Int. Cl.
H04N 1/00 (2006.01)
G03G 15/00 (2006.01)
G06F 3/12 (2006.01)

(52) U.S. Cl.
CPC ......... G03G 15/5004 (2013.01); G06F 3/122 (2013.01); G06F 3/1221 (2013.01); H04N 1/00034 (2013.01); G06F 2212/222 (2013.01)

(58) Field of Classification Search
CPC .. G06F 2212/222; G06F 3/122; G06F 3/1221; G03G 15/5004; Y02D 10/159; Y02D 10/1592; H04N 1/00888; H04N 1/00034; H04N 1/00082; H04N 1/0009; H04N 1/00925

USPC ....... 358/1.11–1.18; 713/300, 320, 321, 323, 713/324, 340
See application file for complete search history.

(56) References Cited

U.S. PATENT DOCUMENTS

| 9,268,542 B1* | 2/2016 | Mars ..................... G06F 8/4442 |
| 2006/0103963 A1* | 5/2006 | Adapathya ............. G11B 33/08 360/60 |
| 2006/0206674 A1* | 9/2006 | Chang ................... G06F 3/0608 711/154 |
| 2007/0177919 A1* | 8/2007 | Saitoh ................... G06F 3/1229 400/62 |
| 2007/0253259 A1* | 11/2007 | Nakatani ............. G06F 12/0888 365/185.33 |
| 2009/0276650 A1 | 11/2009 | Kuroda |
| 2011/0242699 A1* | 10/2011 | Shim ..................... G11B 21/12 360/75 |
| 2012/0221806 A1* | 8/2012 | Kawasaki ............. G06F 3/1214 711/154 |
| 2014/0032839 A1* | 1/2014 | Konishi ................ G06F 3/0646 711/114 |

(Continued)

FOREIGN PATENT DOCUMENTS

| JP | 09017099 A | * 1/1997 | .......... G06F 1/3268 |
| JP | 2008-140492 A | 6/2008 | |

(Continued)

Primary Examiner — Chad Dickerson
(74) Attorney, Agent, or Firm — Canon U.S.A., Inc. IP Division

(57) ABSTRACT

In an image forming apparatus capable of expanding a function by executing an application, when a frequency of access to a nonvolatile HDD (or SSD) in a predetermined period of time is equal to or larger than a predetermined value a CPU limits access of an application to the HDD (or SSD).

11 Claims, 7 Drawing Sheets

(56) References Cited

U.S. PATENT DOCUMENTS

2014/0244915 A1* 8/2014 Post ................... G06F 12/0246
711/103

FOREIGN PATENT DOCUMENTS

| JP | 2008140492 A | * | 6/2008 |
| JP | 2009-295144 A | | 12/2009 |

* cited by examiner

IMAGE FORMING APPARATUS INCLUDING STORAGE DEVICE AND METHOD FOR CONTROLLING THE SAME

BACKGROUND

Field of the Disclosure

The present disclosure relates to an image forming apparatus including a storage device and a method for controlling the same.

Description of the Related Art

HDDs include a disk that is a magnetic recording medium and include a head that performs reading/writing of data. The head accesses a disk while moving in a gap between the head and the disk being rotated at high speed (this operation is refereed to as "loading"). By this, data may be randomly read or written at high speed. When impact is applied during, the loading, the head and the disk of the HDD may be damaged. Therefore, the head is retracted to a home position after the loading of the head (this operation is referred to as "unloading"). The number of times the head is loaded or unloaded as described above is limited for each HDD. In addition, as a lifetime of the HDD, the number of times power is on/off and an operating time and an energizing time of a spindle motor are defined for each HDD. In the lifetime of the HDD described above, the number of times power-on/off is performed may be controlled so that a product lifetime of an image forming apparatus in which the HDD is installed is satisfied (Japanese Patent Laid-Open No. 2009-295144).

Furthermore, in the lifetime of the HDD described above, the energizing time may be controlled so as to satisfy a product lifetime of an image forming apparatus in which the HDD is installed (Japanese Patent Laid-Open No. 2008-140492). Furthermore, the number of times rewriting is performed is limited in solid state drives (SSDs). The limitation of the number of times rewriting is performed corresponds to limitation of lifetimes of the SSDs. Furthermore, the number of times rewriting may be performed is reduced as a fabrication process of a flash memory mounted on the SSD becomes complicated.

A plurality of application programs are installed to attain high functionality and optimization of use environments of users in recent image forming apparatuses. However, depending on an installed application program, the application program may periodically access a storage device with high frequency. The prescribed number of times the head is loaded or unloaded may be exceeded due to the accesses by the application program. If the prescribed number of times is exceeded, it is possible that operation of a storage may not be ensured.

If the number of times access to the storage is performed is limited in the application program, the following problem arises. Specifically, in a case where an unspecified number of application programs are installed and a plurality of applications are installed in a single image forming apparatus, the limitation of the prescribed number of times may be exceeded as a system.

As a method for physically blocking accesses to the storage, power supply to the storage may be stopped or a limitation may be set for the number of times the HDD power source is turned off/on, taking a lifetime into consideration as described above. The On/Off control of the power source is also performed in a power saving mode of the image forming apparatus, and therefore, the On/Off control of the power source may not be performed only for access limitation.

Furthermore, write access performed with high frequency and/or periodic write access are preferably avoided so that acceleration of increase in the number of times rewriting is performed is avoided. The HDD is an example of a storage device.

SUMMARY

Aspects of the present disclosure solve at least one of the problems described above. According to an aspect of the present disclosure, a load applied to a storage device by an application executable by an image forming apparatus is reduced and reliability of the image forming apparatus is improved.

According to some embodiments of the present disclosure, an image forming apparatus is capable of expanding a function by executing an application and includes a non-volatile storage, and a controller configured to limit access of the application to the storage when the number of times the application accesses the storage in a predetermined period of time is equal to or larger than a predetermined value.

Further features of various embodiments will become apparent from the following description of exemplary embodiments with reference to the attached drawings.

DESCRIPTION OF THE EMBODIMENTS

Hereinafter, an example of a storage control apparatus according to an embodiment of the present disclosure will be described with reference to the accompanying drawings. Note that components described in this embodiment are merely examples, and the scope of the present disclosure is not limited to the components.

Hereinafter, an embodiment of the present disclosure will now be described with reference to the accompanying drawings.

Figure 1:
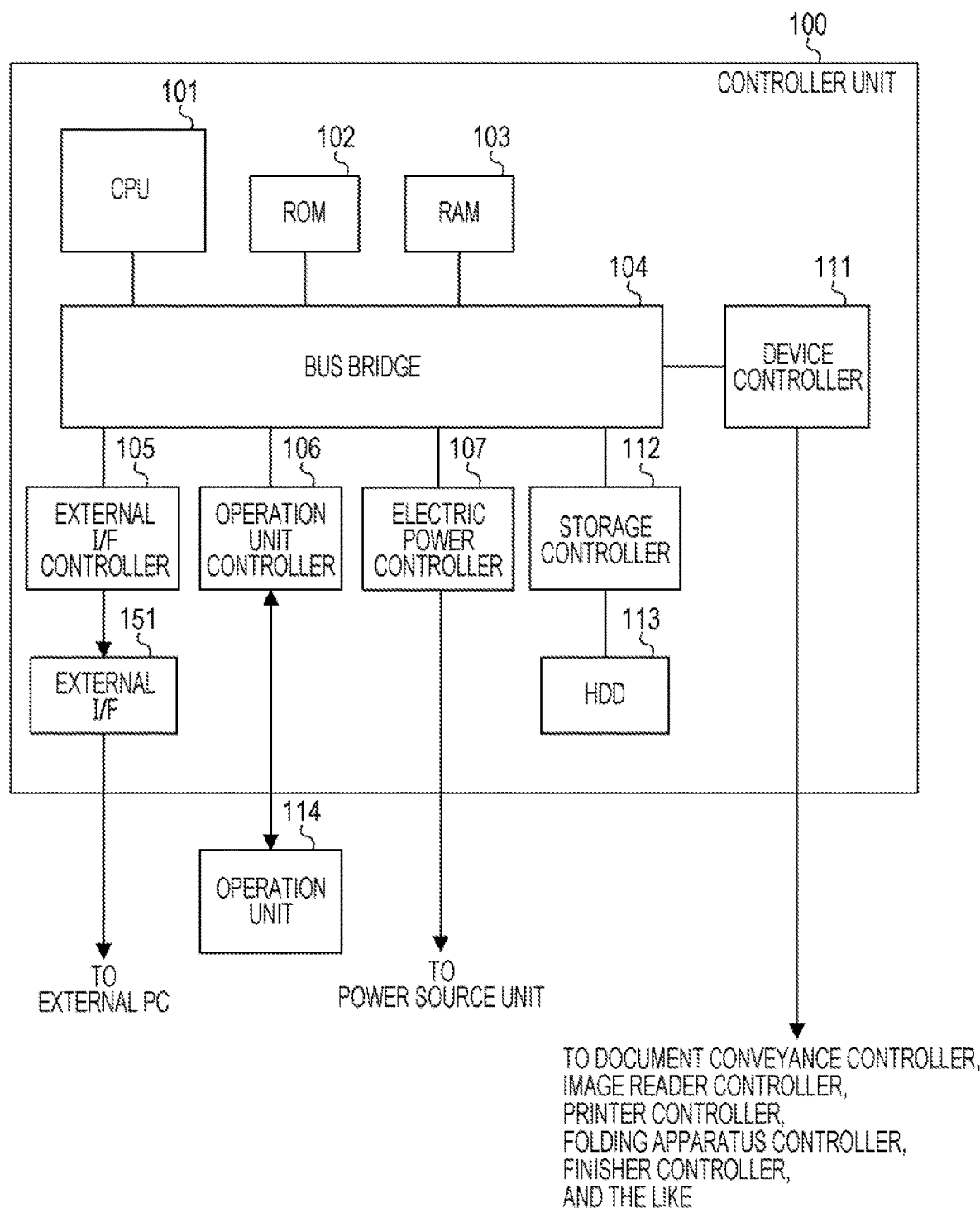
FIG. 1 is a block diagram illustrating a configuration of a controller unit according to the present disclosure.

FIG. 1 is a diagram illustrating an example of a controller unit 100 of an image forming apparatus including a hard disk drive (HDD) 113. A central processing unit (CPU) 101 is an example of a display controller.

The controller unit 100 communicates with a document conveyance device controller which controls a document conveyance device based on an instruction supplied from an operation unit or an external computer and an image reader controller which controls an image reader so as to obtain image data of an input document.

Furthermore, the controller unit 100 communicates with a printer controller which controls a printer unit so as to print image data onto a sheet.

Moreover, the controller unit 100 communicates with a folding apparatus controller which controls a folding apparatus and a finisher controller which controls a finisher so as to realize a desired output state, such as a state in which printed sheets are stapled or punched.

An external interface (I/F) 151 is used for connection to an external computer.

For example, the external I/F 151 is connected to an external computer through a network or an external bus, such as a universal serial bus (USB), develops print data supplied from the external computer so as to obtain an image to be output, and transmits image data included in the HDD 113 to the external computer.

The controller unit 100 including the CPU 101 executes programs of an operating system (OS) and the like so as to realize functions of the OS.

The CPU 101 connected to a bus bridge 104 reads an initial activation program of the CPU 101 from a read only memory (ROM) 102 that stores the initial activation program through the bus bridge 104.

Furthermore, the CPU 101 is also connected to a random access memory (RAM) 103, which is used as a work area for calculation performed in accordance with control and a storage controller 112, which controls the storage device through the bus bridge 104.

The storage controller 112 is a hardware module which performs read/write control of the storage device, such as the HDD and the SSD, and a serial advanced technology attachment (SATA) interface or other compatible interface (e.g., Peripheral Component Interconnect (PCI), Peripheral Component Interconnect Express (PCIe)) is used for connection to the storage device.

The HDD 113 is used to store main programs including the programs of the OS of the CPU 101, image data obtained by the image reader and the external I/F 151, images edited by an operation unit 114, and application programs.

Furthermore, the HDD 113 is used to store application programs and user preference data. The HDD 113 may be accessed by the CPU 101.

An operation unit controller 106 connected to the operation unit 114 displays an image generated by the CPU 101 and transmits information set by the operation unit 114 to the CPU 101.

Furthermore, an external I/F controller 105, which controls the external I/F 151 and a USB interface, and the operation unit controller 106, which controls the operation unit 114, are connected to the bus bridge 104.

A device controller 111 is connected to the document conveyance controller, the image reader controller, the printer controller, the folding apparatus controller, and the finisher controller, and the device controller 111 controls the controllers.

An electric power controller 107 is connected to a power source unit and enters various electric states under control of the CPU 101. In a power state 1 of this embodiment, power supply to portions connected to the device controller 111, such as the document conveyance controller and the printer controller, is stopped. Other portions are energized. In a power state 2, in addition to the power supply stop state of the power state 1, power supply to other portions is stopped. Specifically, in the power state 2, power supply to portions of the storage controller 112, the operation unit controller 106, the operation unit 114, and the like included in the controller unit 100 is further stopped.

Figure 4:
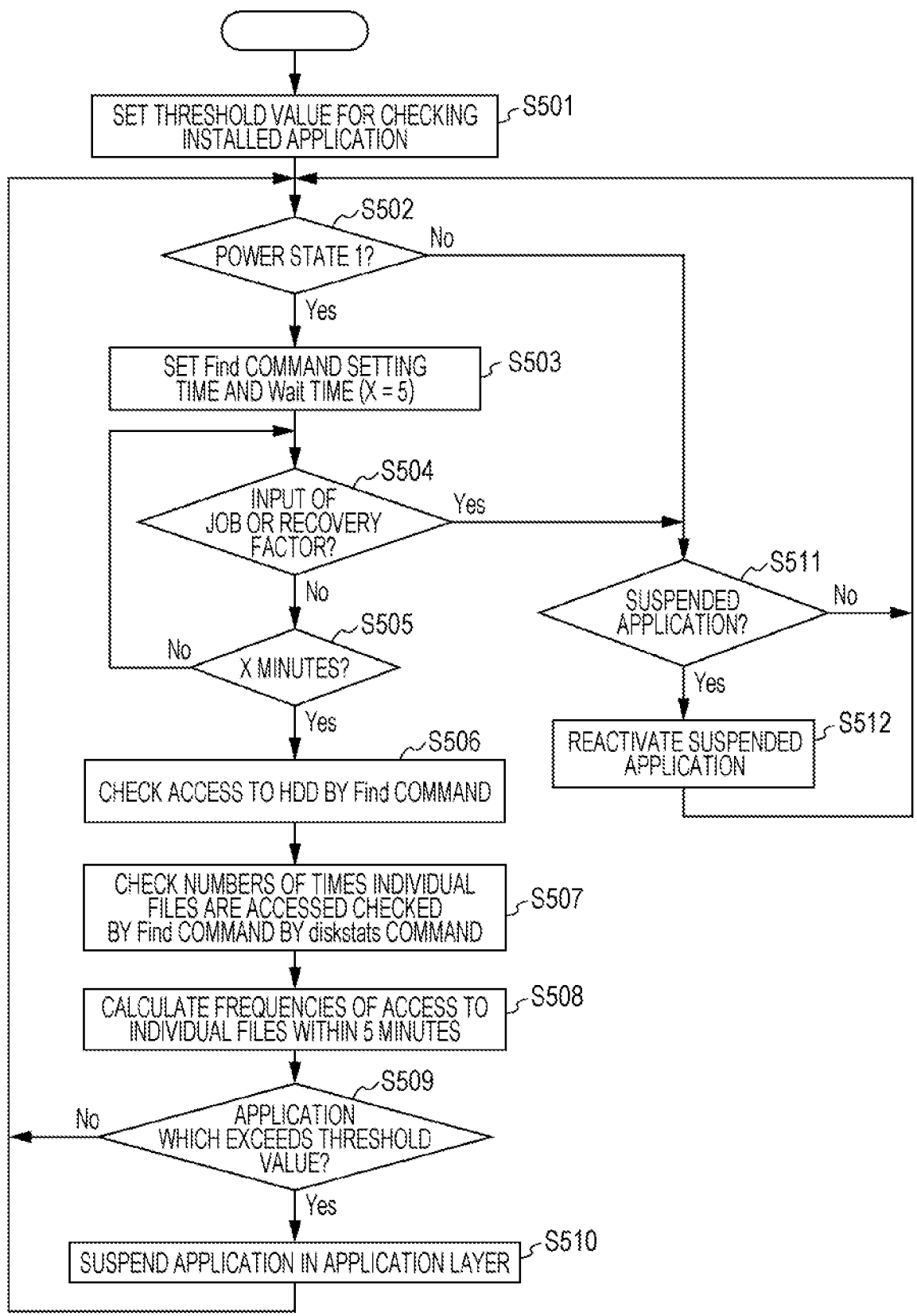
FIG. 4 is an example of a flowchart according to an embodiment.
Figure 5:
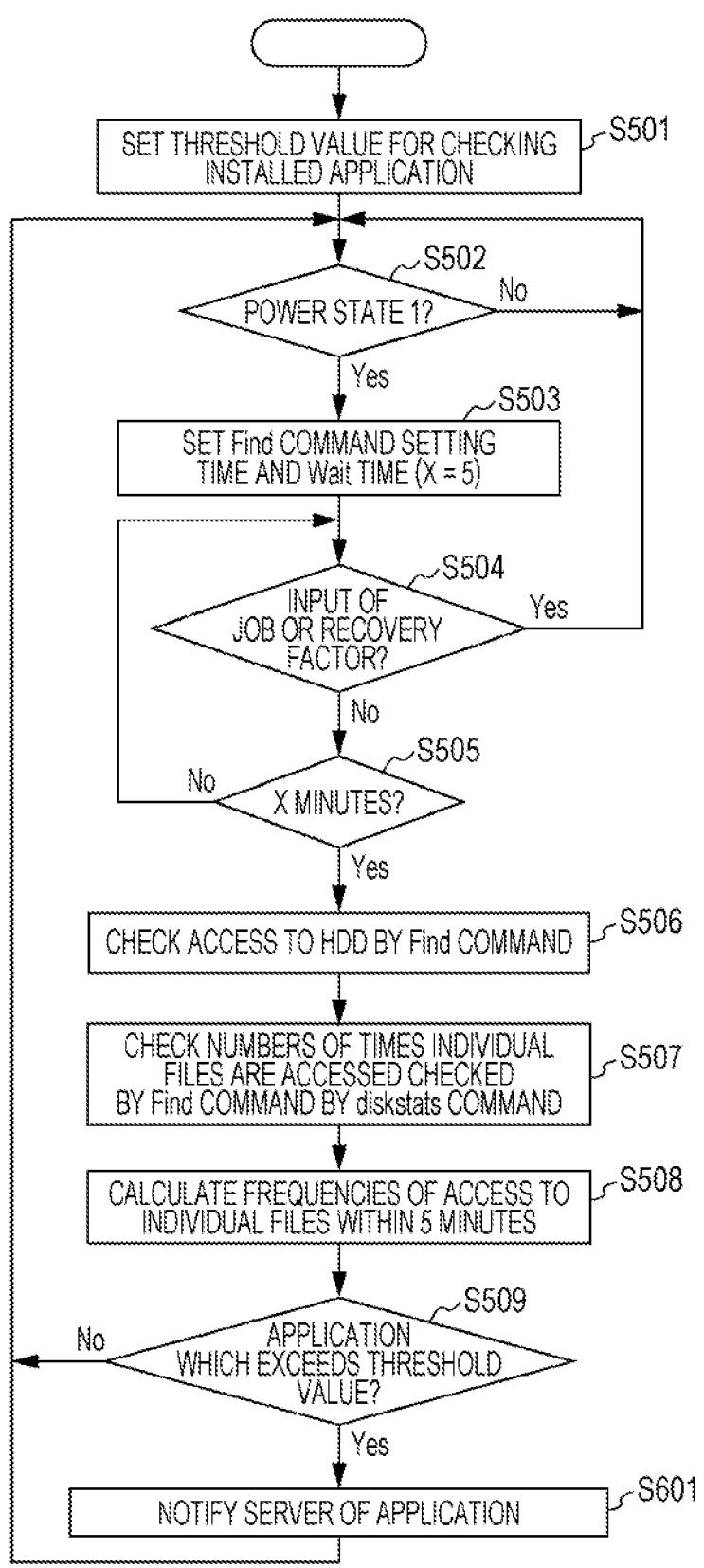
FIG. 5 is an example of a flowchart according to a modification.
Figure 6:
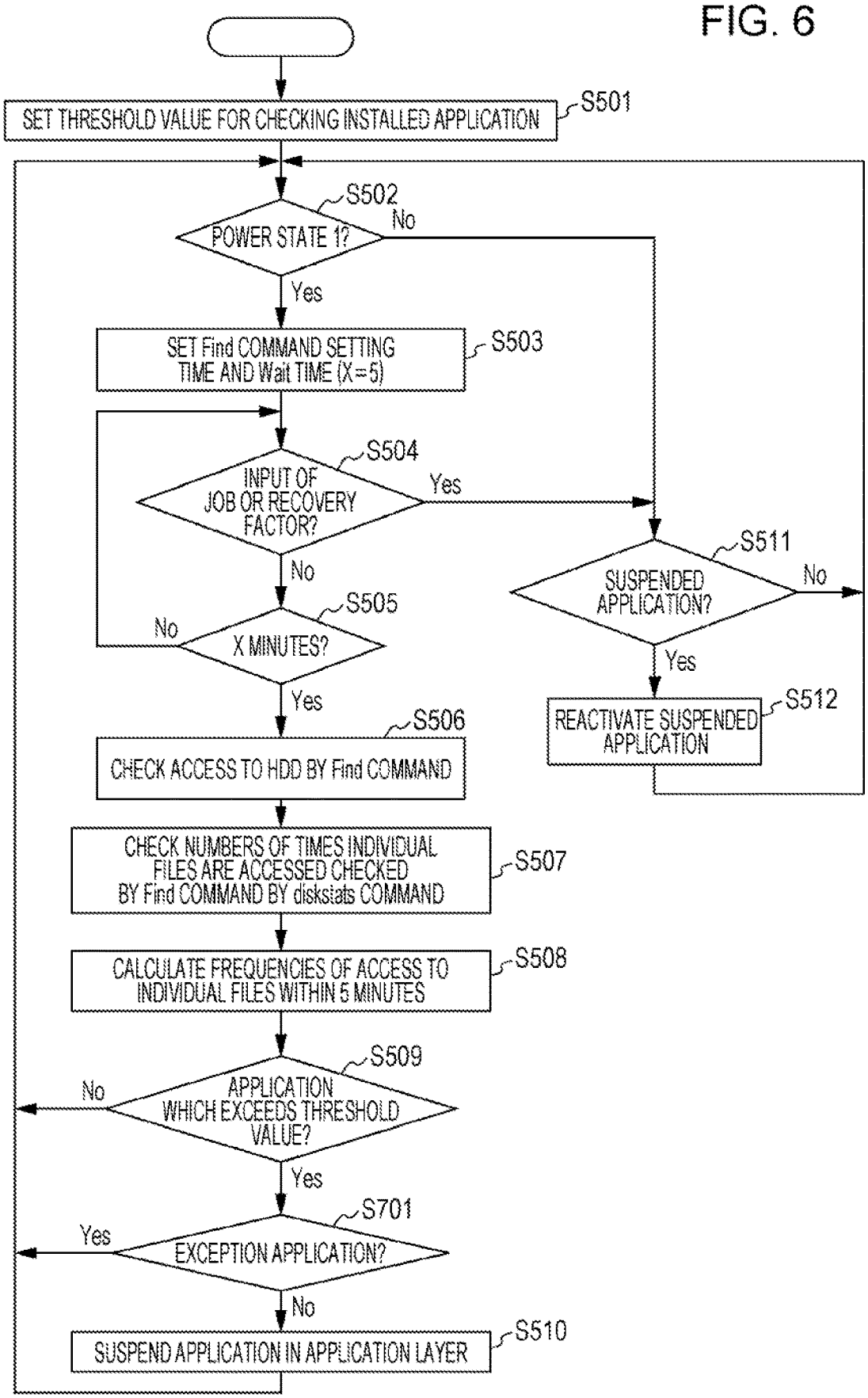
FIG. 6 is an example of a flowchart according to another embodiment.

Portions of processes in flowcharts of FIGS. 4, 5, and 6 are realized when the CPU 101 executes processes based on the programs stored in the ROM 102 and the like.

Figure 2:
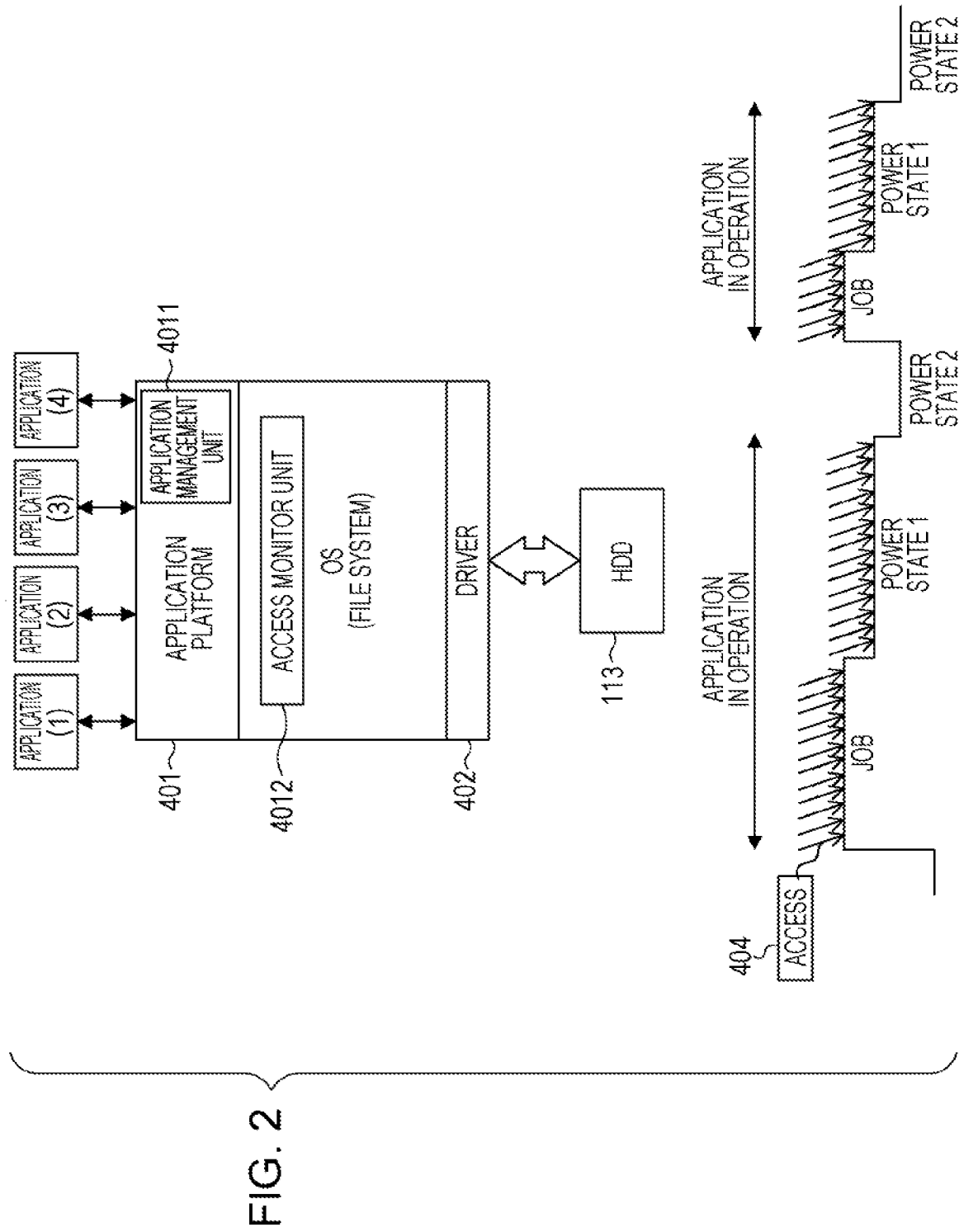
FIG. 2 is a diagram illustrating an example of a state of access to a storage according to an embodiment.

FIG. 2 is a diagram schematically illustrating a software configuration of the operating system (OS) when application programs access the HDD 113 in a general image forming apparatus and an actual access state. The OS is implemented by a real-time OS for a so-called embedded system.

Examples of the OS include Linux® and other OSs. An application platform 401 serving as an interface with a plurality of applications, such as applications 1 to 4, is defined on the OS (including a file system).

The application platform 401 receives various requests from various applications, such as a request for accessing the HDD 113, executes arbitration for the applications, and transmits and receives data in practice. The application platform 401 includes a virtual execution environment of an interpreter, such as Java (registered trademark) VM, and the like. Furthermore, the application platform 401 includes various libraries for operating the applications 1 to 4. The applications 1 to 4 may be implemented by a program language of high portability, such as Java and Lua Script.

A driver layer 402 issues a control command to the storage controller 112 in response to a request supplied from the application platform 401 so as to perform access to the HDD 113.

An access 404 of FIG. 2 indicates the access to the HDD 113 by the applications 1 to 4, and the access is frequently performed during a job and in the power state 1.

An application management unit 4011 instructs the applications 1 to 4 to be started or stopped. Furthermore, the application management unit 4011 may stop the applications 1 to 4 being executed and uninstall (delete) the applications 1 to 4. Note that, the term "start" represents a state in which a process of an application is activated. The term "stop" represents a state in which a process of an application is stopped. Furthermore, a term "starting" represents a state in which a process of an application is in course of activation. A term "stopping" represents a state in which a process of an application is being stopped. When a process of an application is stopped, the application does not receive requests from applications other than a management application, and resources of a memory and the CPU are hardly consumed. An access monitoring unit 4012 will be described in detail hereinafter.

Figure 3:
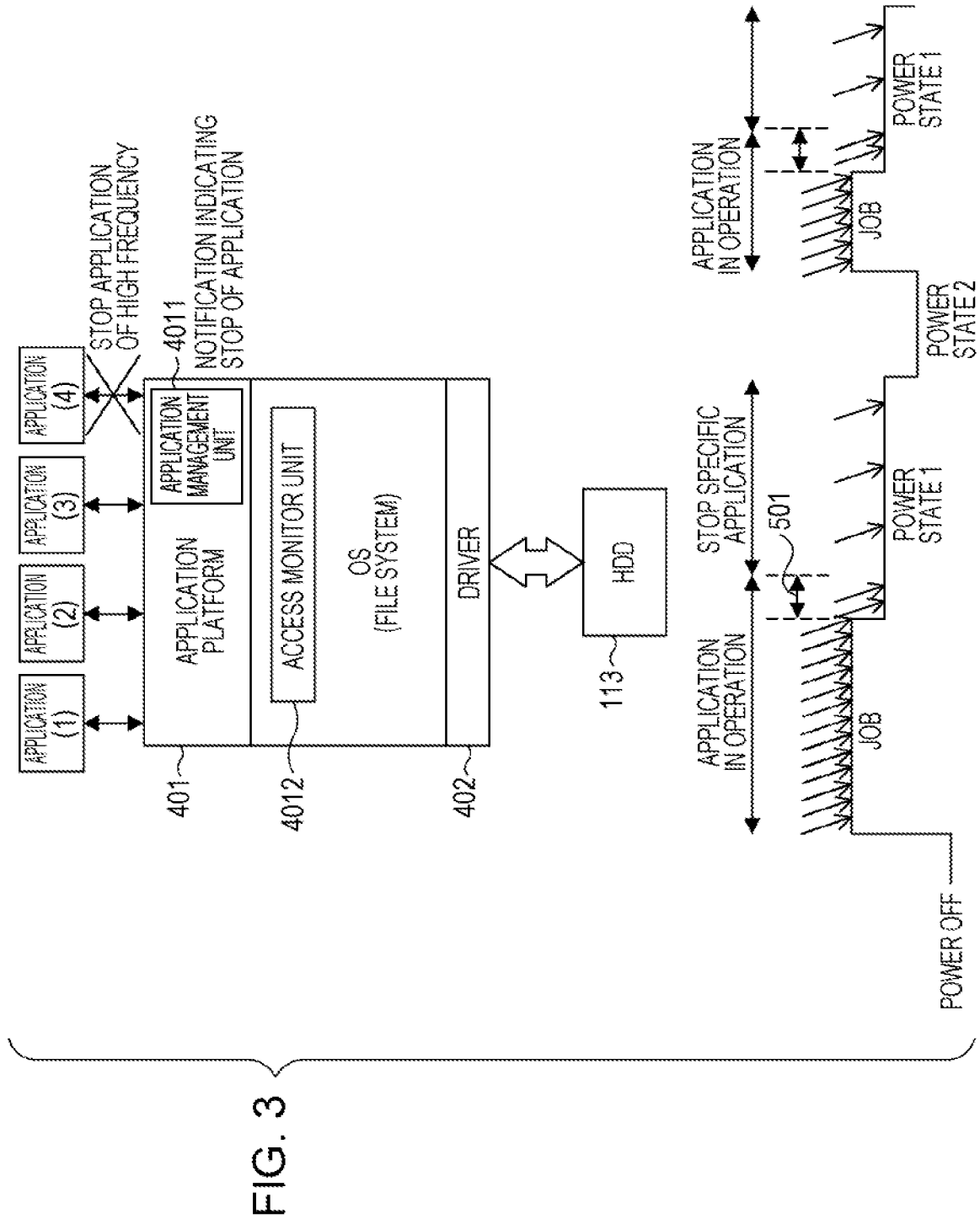
FIG. 3 is a diagram illustrating another example of the state of access to a storage according to an embodiment.

FIG. 3 is a diagram illustrating an example of this embodiment. In FIG. 3, processes of application programs in the image forming apparatus are stopped according to this embodiment, and access to the HDD 113 is limited. Specifically, the access monitoring unit 4012 counts the numbers of times the applications 1 to 4 access the HDD 113 within a predetermined period of time (one minute, for example).

When the access monitoring unit 4012 determines that an access frequency of the application 4 per one minute exceeds a predetermined number of times, a notification indicating that the access from the application 4 is to be stopped is transmitted to the application management unit 4011. Specifically, the access monitoring unit 4012 calls an application stop API included in the application management unit 4011. Then the application management unit 4011 instructs the application 4 to stop a process of the application 4 in response to the call of the application stop API. The application 4 is stopped in response to the stop instruction. The process of the application 4 continues in a stop state until the application management unit 4011 issues a start instruction to the application 4 again.

A reference numeral 501 in FIG. 3 indicates a waiting time corresponding to a timer setting time (five minutes in this embodiment) after the power state 1 is entered. In the embodiment below, the application 1 does not perform periodic access, the application 2 performs periodic access every one hour, the application 3 performs periodic access every 10 minutes, and the application 4 performs periodic access every 30 seconds. An application which performs periodic access every 1 minute indicates an application which performs periodic access to an HDD every 1 minute. Note that applications are operated in the application platform 401 in the follows states. "Installed" indicates a state in which an application has not been started since the application is installed. Alternatively, "Installed" indicates a state in which an application has not been started since the application is stopped, a printer is powered off, and the printer is reactivated.

FIG. 4 is a flowchart of an example embodiment of the present disclosure.

In general, a variety of types of operating systems (and file systems) exist, including Windows and Linux, and commands of Linux are taken as an example in this embodiment. Processes in FIG. 4 are principally realized when the CPU 101 executes the access monitoring unit 4012 of FIG. 3.

When an image forming apparatus is powered, the CPU 101 reads a program from the ROM 102 or the HDD 113 so as to perform an activation process such that the image forming apparatus may perform a desired operation. At the time of the activation process, the CPU 101 checks and sets types of applications installed in the image forming apparatus and a threshold value of frequencies of access to the HDD 113 (S501).

In this embodiment, the applications 1 to 4 have been installed. A threshold value to be set is 60 seconds per access (one access every 60 seconds), for example.

In S502, the CPU 101 causes a power controller 107 to determine whether the power state 1 has been set. Specifically, it is determined whether the power state 1, which is an example of a sleep state, has been entered. When the determination is affirmative, the process proceeds to S503. On the other hand, when the power state indicates "job", the process proceeds to S511.

In S503, the CPU 101 sets a timer time (e.g., five minutes) for measuring an access frequency to a timer included in the CPU 101 when it is determined that the power state 1 has been entered. Furthermore, the CPU 101 sets five minutes as a time for a Find command of Linux. By this command, the CPU 101 may extract a file of an application which has accessed the HDD 113 within a predetermined period of time.

In S504 and S505, the CPU 101 determines whether a job has been input to the image forming apparatus before the timer setting time (X=5 minutes, for example) has elapsed. When the job is input before the timer setting time has elapsed, the process proceeds to S511. When five minutes has elapsed in the power state 1, the process proceeds to S506 where applications which have accessed the HDD are specified.

In S506, the CPU 101 determines applications which have accessed the HDD 113 in the power state 1 and the frequencies of the access of the applications to the HDD 113 based on the Find command provided in the OS.

In this embodiment, the application 1 does not perform periodic access, the application 2 performs periodic access every one hour, the application 3 performs periodic access every 10 minutes, and the application 4 performs periodic access every 10 seconds, and therefore, processes of the applications 2 to 4 (access to the HDD 113) may be extracted.

In S507, the numbers of times write/read is performed on the HDD 113 by the applications which have accessed the HDD 113 and which are determined by the Find command are determined in response to a diskstats command provided in the OS.

In this embodiment, the application 1 does not perform periodic access, the application 2 performs periodic access every one hour, the application 3 performs periodic access every 10 minutes, and the application 4 performs periodic access every 10 seconds, and therefore, the applications 2 and 3 may access the HDD 113 once at most and the application 4 may access the HDD 113 approximately 30 times within the 5 minutes. In this embodiment, the CPU 101 checks the recorded numbers of times the HDD 113 is accessed for individual applications in practice.

In S508, the CPU 101 calculates access frequencies within the five minutes in accordance with the numbers of times the individual applications have made access determined in S506 and S507 and the time set in the timer. Here, it is estimated that the numbers of times the applications 2 and 3 have made access are one at most, and therefore, a frequency of 300 seconds per access or less (one or fewer accesses every 300 seconds) is expected. Furthermore, it is expected that an access frequency of the application 4 is approximately 10 seconds per access (one access every 10 seconds), and as described above, the numbers of access are checked for individual applications in practice.

In S509, the CPU 101 determines whether the access frequencies calculated in S508 exceed the frequency threshold value (60 seconds per access) set in S501. Here, as for an application which is determined that the access frequency thereof per unit time is high, the CPU 101 issues an instruction for stopping a process of accessing the HDD 113 performed by the application to the application platform 401 (S510). When the access frequencies of the applications are lower than the threshold value, the process returns to S502 of the flowchart where the power state is checked. In this embodiment, if the application 4 performs access in practice as estimated, the following operation is performed. If a calculated frequency of the application 4 is 10 seconds per access relative to the frequency threshold value of 60 seconds per access, the CPU 101 determines that the frequency of the application 4 exceeds the frequency threshold value. Then the CPU 101 causes the application 4 to stop the access to the HDD 113. Specifically, as described with reference to FIG. 3, the CPU 101 instructs the application management unit 4011 to stop the application 4 under control of the access monitoring unit 4012.

In S511, it is determined whether an application which has stopped access to the HDD 113 when the power state is "job" or when a job is input exists. During a job process, electric power is supplied to all the hardware blocks in FIG. 1. If a certain application has stopped the process of accessing the HDD 113, the application is restarted (S512). The term "restart" indicates control of a state of the process from "stop" through "starting" to "activating". In the job process, the application is not required to be stopped in many cases. This is because a print job accesses the HDD 113. There are not any problems if the applications 1 to 4 access the HDD 113 at this timing in many cases. Stopping an application of a high access frequency in the applications 1 to 4 for a long period of time may be inconvenient. However, it is convenient if control is performed such that the application in which the process thereof has been stopped is restarted at a timing when the image forming apparatus receives a job.

Modification

FIG. 5 is a flowchart of a modification of the foregoing embodiment.

The process until S509 is the same as that in the flowchart of FIG. 4, and a flow after S509 is different, and therefore, different portions are mainly described.

As for an application which is determined that an access frequency per unit time is high in S509, in S601 a CPU 101 may transmit information on the application to a server connected to a LAN which is a component of an external I/F 115 through an external I/F controller 105.

In this way, an application which unnecessarily makes access may be immediately detected, and such an application may be improved.

Other Embodiments

Certain applications, such as a security application, may not stop access to an HDD 113, unlike the first embodiment, in terms of security even if frequent access is performed on the HDD 113.

Therefore, in this embodiment, a method for determining an application in which access to the HDD 113 is difficult to be stopped in terms of security as an exception application will be described with reference to the drawings.

Figure 7:
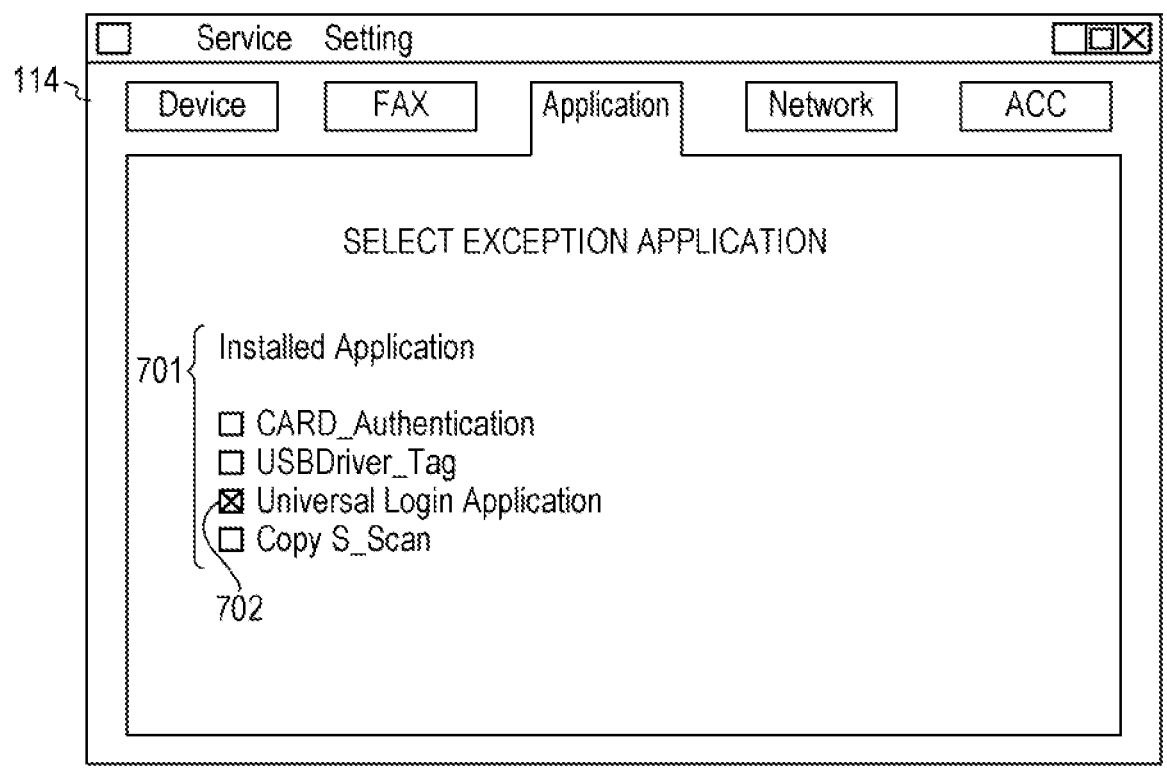
FIG. 7 is a diagram illustrating an example of a setting method according to a further embodiment.

FIG. 7 is a diagram illustrating an example of a setting method according to an embodiment different from the foregoing embodiment. A unit which sets a specific application as an exception using an operation unit 114 is illustrated. In FIG. 7, an application list 701 including applications installed in an image forming apparatus is displayed. A display process is performed as denoted by a reference numeral 702 using a list managed by an application management unit 4011. A state in which a checkbox of an application to be selected as an exception application is checked (selected) is illustrated.

In some embodiments, in an actual setting, a service engineer causes the image forming apparatus to enter a service mode by operating the operation unit 114 so as to set an exception application. When the service engineer touches a tab of "Application", a CPU 101 receives a notification indicating the touch and performs following operation under control of the application management unit 4011. The CPU 101 checks installed applications and displays a list on a screen of the operation unit 114. Then the CPU 101 receives a selection of a checkbox of an application in which access to the HDD 113 is not to be stopped performed by the service engineer. Information on the selected application is transmitted to the CPU 101 and recorded in the HDD 113 and the other memories.

With this configuration, the embodiment will be described with reference to the flowchart of FIG. 6. The process until S509 is the same as that in the flowchart of FIG. 6, and different portions including a process after S509 are mainly described.

The CPU 101 determines whether an application of a high access frequency per unit time determined in S509 has been set as an exception application, for example, by a setting performed by the service engineer (S701). In a case where the application has already been set as an exception application, any process is not especially performed, and the process returns to S502. In a case where the application has not been set as an exception application, the CPU 101 issues an instruction for stopping the application to the application platform 401 (S510). The determination as to whether the application has been set as an exception application may be made based on an input to the operation unit 114 of the image forming apparatus (FIG. 7). Specifically, the determination may be made based on the exception application information which is transmitted to the CPU 101 and recorded in the HDD 113 and the other memories. In this embodiment, at least one of an IC card authentication application, a login application for performing authentication of login to the image forming apparatus, a USB driver, and a program for controlling a copy function may be selected by checkboxes. The exception application may be selected by the user in a market or excepted from stop targets in advance as a setting. Accordingly, control may be performed such that applications which are inconvenient for the user and an administrator if the applications are stopped, such as an application of authentication and an application of a USB function, are specified as exception applications and are not stopped even if frequencies of access to the HDD 113 is high. The exception application is an example of an application in which access is not limited.

Since the unit and the method described in the foregoing embodiment are provided, a high frequency of access to the HDD 113 which is constantly performed in general as illustrated in FIG. 2 may be reduced as illustrated in FIG. 3.

Furthermore, since the unit and the method described in the modification are provided, an application which performs unnecessary access may be immediately detected and improved.

Moreover, since the unit and the method described in the other embodiments are provided, a unit for avoiding the stopping of access to the HDD 113 may be provided in applications in which access to the HDD 113 may not be conveniently stopped in terms of function.

As described above, the image forming apparatus which has functions expandable by executing the applications 1 to 4 as examples of an application is disclosed. Examples of the image forming apparatus include a laser beam printer, a scanner, and a multifunction peripheral of the laser beam printer and the scanner.

The HDD 113 is disclosed as an example of a nonvolatile storage unit. However, an SSD may be employed.

If a frequency of access to the HDD 113 in a predetermined period of time is equal to or larger than a predetermined value, the CPU 101 limits access by the applications to the HDD 113. The CPU 101 may perform a process described below when the image forming apparatus is in a predetermined power saving state, that is, the power state 1, for example. Specifically, access by the applications to the HDD 113 is limited when a frequency of access to the HDD 113 in a predetermined period of time is equal to or larger than a predetermined value. The limitation of access may include a case where the applications perform an access prohibition setting. The limitation of access may include a case where the number of times access is performed is limited instead of the total prohibition. The limitation of access may include a case where physical access does not occur although an access request is accepted. Consequently, a file system may not response to an application.

The CPU 101 may cancel the access limitation set by the CPU 101 when the power state 1 of the image forming apparatus is shifted to a power state in which a job may be processed.

The CPU 101 may limit access to the HDD 113 by the applications by stopping processes of the applications 1 to 4. Furthermore, the CPU 101 may set and store an exception application which is an exception of access limitation selected from among applications executable by the image forming apparatus in the HDD 113 and the like.

The image forming apparatus includes the CPU 101 which controls a process of displaying the executable applications.

Then exception application which is an exception of access limitation may be selected from among the displayed applications. Then the CPU 101 may set the exception application in accordance with a result of the selection.

Alternatively, display of only an application which has a high access frequency may be performed when the access frequency of the application exceeds a threshold value without performing the access limitation. Types of applications may be checked and it may be determined that applications which are required to be constantly operated are not stopped.

According to this embodiment, states of access to a storage by applications installed in the image forming apparatus may be analyzed. Then a process of an application which performs access over a specific frequency is stopped so that access to the storage is stopped. By this, a lifetime of the storage may be improved. Furthermore, since information on the application in which an access frequency thereof exceeds a prescribed frequency is transmitted to the server, an unnecessary access by the application may be recognized. Accordingly, modification of the application may be prompted so that unnecessary access is avoided.

Furthermore, an exception process may be set by the operation unit or the like to an application which requires periodic access with high frequency for improvement of security. By this, the security may be further improved.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device (e.g., SSD), a memory card, and the like.

While the present disclosure has described exemplary embodiments, it is to be understood that the claims are not limited to the disclosed exemplary embodiments. The scope of the following claims is to be accorded the broadest interpretation so as to encompass all such modifications and equivalent structures and functions.

This application claims priority to Japanese Patent Application No. 2018-073488, which was filed on Apr. 5, 2018 and which is hereby incorporated by reference herein in its entirety.

What is claimed is:

1. An image forming apparatus capable of executing a plurality of applications, the image forming apparatus comprising:
   a nonvolatile storage; and
   a controller having one or more processors which execute instructions stored in one or more memories, the controller being configured to:
   monitor a number of times an application accesses the nonvolatile storage, and
   execute an application whose number of times of accessing the nonvolatile storage in a predetermined period of time is not greater than a predetermined value,
   wherein the controller stops an application whose number of times of accessing the nonvolatile storage in the predetermined period of time is greater than the predetermined value.

2. The image forming apparatus according to claim 1, wherein, when the image forming apparatus is in a predetermined power saving state, the controller acquires the number of times of accessing the nonvolatile storage, and calculates the number of times of accessing the nonvolatile storage in the predetermined period of time.

3. The image forming apparatus according to claim 2, wherein the controller cancels the stop of the process when the predetermined power saving state of the image forming apparatus is shifted to a power state in which a job may be processed.

4. The image forming apparatus according to claim 1, wherein the predetermined period of time starts when the controller issues a command for checking an application that accesses the nonvolatile storage in the predetermined period of time in a case where the image forming apparatus is in the predetermined power saving state.

5. The image forming apparatus according to claim 1, wherein the controller sets an application in which access is not stopped from among applications executable by the image forming apparatus.

6. The image forming apparatus according to claim 5, further comprising a display,
   wherein the controller controls a process of displaying the applications executable by the image forming apparatus on the display, and
   wherein the controller sets the application in which access is not stopped from among the applications displayed on the display.

7. A method for controlling an image forming apparatus which is capable of executing a plurality of applications and which includes a nonvolatile storage, the method comprising:
   monitoring a number of times an application accesses the nonvolatile storage;
   executing an application whose number of times of accessing the nonvolatile storage in a predetermined period of time is not greater than a predetermined value; and
   stopping an application whose number of times of accessing the nonvolatile storage in the predetermined period of time is greater than the predetermined value.

8. The method of claim 7, further comprising:
in a case where the image forming apparatus is in a predetermined power saving state, acquiring the number of times of accessing the nonvolatile storage, and calculating the number of times of accessing the nonvolatile storage in the predetermined period of time.

9. The method for controlling an image forming apparatus according to claim 8, further comprising canceling the stopping when the predetermined power saving state of the image forming apparatus is shifted to a power state in which a job may be processed.

10. The method for controlling an image forming apparatus according to claim 7, further comprising setting an application in which access is not stopped from among applications executable by the image forming apparatus.

11. The method for controlling an image forming apparatus according to claim 10, further comprising:
controlling a process of displaying the applications executable by the image forming apparatus on a display,
wherein, in the setting, the application in which access is not stopped is set from among the applications displayed on the display.

\* \* \* \* \*